R. H. McLAIN.
MOTOR CONTROL.
APPLICATION FILED SEPT. 17, 1910.

1,039,568.

Patented Sept. 24, 1912.

WITNESSES
J. Earl Ryan.
J. Ellis Glen.

INVENTOR
ROBERT H. McLAIN
BY Albert G. Davis
HIS ATTORNEY

UNITED STATES PATENT OFFICE.

ROBERT H. McLAIN, OF SCHENECTADY, NEW YORK, ASSIGNOR TO GENERAL ELECTRIC COMPANY, A CORPORATION OF NEW YORK.

MOTOR CONTROL.

1,039,568.  Specification of Letters Patent.  Patented Sept. 24, 1912.

Application filed September 17, 1910. Serial No. 582,502.

*To all whom it may concern:*

Be it known that I, ROBERT H. MCLAIN, a citizen of the United States, residing at Schenectady, county of Schenectady, State of New York, have invented certain new and useful Improvements in Motor Control, of which the following is a specification.

This invention relates to the control of electric motors and has for its object the provision of means whereby the speed of an electric motor may be automatically varied within predetermined limits by the opening and closing of a control switch.

My invention relates more specifically to the speed control of shunt wound motors by varying the field strength of the motor. In the control of shunt wound motors it is common to increase the speed of the motor, after it has been brought to running speed, by inserting a resistance in series with the field of the motor, the speed being again decreased by the strengthening of the field. This is commonly done by gradually cutting out or inserting the resistance either manually or automatically. In carrying out my invention, instead of gradually varying the resistance of the field circuit, I operate upon the field resistance as a whole by providing means whereby the resistance is alternately inserted or eliminated at a rapid rate until the motor finally reaches a speed corresponding to the ultimate field strength desired. In the practical embodiment of my invention I may employ an overload relay for short circuiting the resistance, the connections being such that the contact member of the relay will operate rapidly to open and close the short circuit of the resistance.

Figure 1:
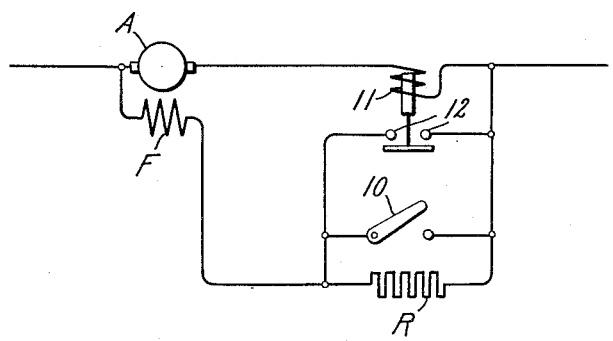
Figure 2:
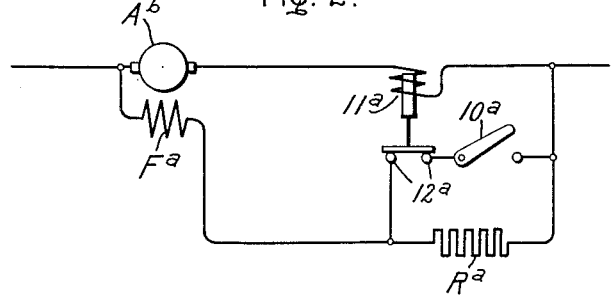

In the accompanying drawing, in which I have shown my invention diagrammatically in various aspects, Figure 1 is a diagram showing my invention as employed for increasing the speed of the motor; Fig. 2 is a diagram showing my invention employed for decreasing the speed of the motor; and Fig. 3 is a diagram showing the invention as employed for either increasing or decreasing the speed of the motor.

Referring first to Fig. 1, A represents the armature and F the shunt field of an electric motor. A resistance R is connected in series with the field F. A switch 10 is connected in shunt with the resistance so as to short circuit the resistance. An overload relay 11, adapted to bridge the contacts 12 at a predetermined flow of current through the armature, is arranged in shunt to the switch 10 and resistance R. The mode of operation of this embodiment of the invention is as follows: Assuming the motor to be running at normal speed and it is desired to increase the speed of the motor, the switch 10, which has heretofore been closed, is opened. There being no excessive current in the armature circuit, the contacts 12 of the relay 11 are not bridged. When the switch 10 is opened the current in the field of the motor is reduced, thereby reducing the field magnetization and the motor starts to speed up. At the same time there is an excessive current in the armature circuit which causes the overload relay 11 to operate, thereby short circuiting the resistance R. This momentarily increases the current in the field circuit and likewise decreases the current in the armature circuit, causing the contact of the relay 11 to again drop so as to open the short circuit on the resistance. The contact of the relay 11 continues to vibrate, opening and closing a short circuit on the resistance, the speed all the time increasing until the motor finally reaches a speed corresponding to the strength of the field with the resistance R in series with it.

In Fig. 2 I have shown the invention employed for decreasing the speed of the motor. In this case the switch $10^a$ is in series with the contacts $12^a$ of the relay $11^a$ so that the switch $10^a$ must be closed and the contacts $12^a$ bridged in order to short circuit the resistance $R^a$ in series with the field $F^a$ of the motor. Assuming the motor to be running at a high speed corresponding to the field strength with the resistance $R^a$ in series with the field winding, the switch $10^a$ will be open. If, now, it is desired to reduce this speed, the switch $10^a$ is closed. This, of course, short circuits the resistance $R^a$ and suddenly strengthens the field of the motor. This will cause the motor to operate as a generator and generate an excessive current through the armature $A^a$ and the winding of the relay $11^a$. The short circuit on the resistance $R^a$ will consequently be opened at the contacts $12^a$ and the current in the field circuit will be once more reduced. The contacts $12^a$ will again be bridged and the current in the armature circuit will be reduced causing the relay to drop. In this way the relay will vibrate back and forth, opening and closing a short circuit on the resistance $R^a$, the speed of the motor all the time decreasing until it finally reaches a speed which corresponds with the elimination of the resistance $R^a$ from the field circuit.

Figure 3:
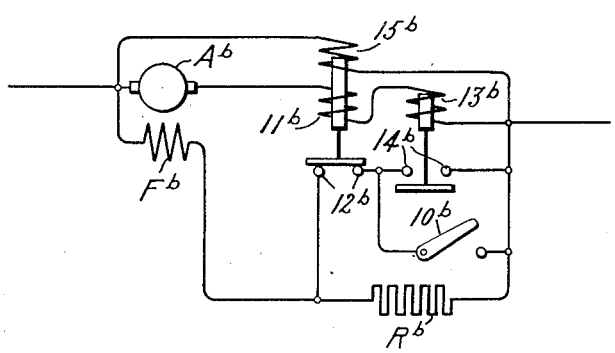

In Fig. 3 I have shown what is virtually a combination of Figs. 1 and 2. In this case, by opening the switch $10^b$ the motor will be gradually brought up to a speed corresponding to the insertion of the resistance $R^b$, in the field circuit $F^b$, while when the switch is closed the speed of the motor will be reduced to that corresponding to the elimination of the resistance $R^b$ from the field circuit. In this case I provide two relays $11^b$ and $13^b$ having their windings in series with each other and with the armature $A^b$. The relay $11^b$ normally bridges the contacts $12^b$ while the relay $13^b$ only bridges the contacts $14^b$ when the current is excessive. The switch $10^b$ is connected between the two relays. The relay $11^b$ has in addition to its series coil a shunt coil $15^b$ differentially wound with respect to the series winding of the relay during normal operation of the motor so as to counteract the series winding. If now the switch $10^b$ is opened and the contacts $12^b$ are bridged, the same result will be produced as is described in connection with Fig. 1. The relay $13^b$ will vibrate to increase the speed of the motor until finally it corresponds to the speed produced by the insertion of the resistance $R^b$ in circuit with the field winding. While this vibration is taking place the relay $11^b$ does not operate since the shunt winding counteracts the effect of the series winding and holds the relay closed. If now the switch is closed the same result will be produced as described in connection with Fig. 2. The current in the series coil of the relay $11^b$ will now be reversed and acting in unison with the shunt coil, the direction of current through which does not change, will open the relay and the vibration will continue until the speed of the motor is reduced to that corresponding to the full field strength. While this vibration of the relay $11^b$ is going on, the relay $13^b$ may likewise operate but if it does, it will have no effect, since the contacts are shunted by the switch $10^b$. From this it will be seen that the motor can be increased or decreased in speed without having an excessive armature current, by simply opening or closing the switch $10^b$.

While I have described my invention as including various forms embodying concrete operating mechanism and connections, it is obvious that I do not limit my invention to the particular applications herein described nor to the particular means for carrying them out, except in so far as it is limited by the scope of the claims annexed hereto.

What I claim as new and desire to secure by Letters Patent of the United States is:—

1. The combination with an electric motor, of means for varying the speed thereof comprising a resistance for the field circuit of the motor and an overload relay responsive to variations in current due to the effect of said resistance which continuously opens and closes a short circuit on said resistance until the motor reaches a speed corresponding to the predetermined field strength.

2. The combination with an electric motor, of means for varying the speed thereof comprising a resistance for the field circuit of the motor, and a normally open relay for short circuiting said resistance when closed, said relay being responsive to variations in current due to the effect of said resistance so as to vibrate until the motor reaches a speed corresponding to the field strength established by said resistance.

3. The combination with an electric motor, of means for varying the speed thereof comprising a resistance for the field circuit of the motor, a switch for controlling said resistance, and a relay for automatically opening and closing a short circuit on said resistance to bring the motor to a speed corresponding to the strength of the field as established by said switch.

4. The combination with an electric motor, of means for varying the speed thereof comprising a resistance for the field circuit of the motor, and means controlled by variations in the motor current due to the effect of said resistance for continuously opening and closing a short circuit on said resistance until the motor reaches a speed corresponding to the predetermined field strength.

5. The combination with an electric motor, of means for varying the speed thereof comprising a resistance for the field circuit of the motor, a switch in shunt to said resistance, and a pair of relays, one of which operates to automatically open and close a short circuit on said resistance to increase the speed of the motor when said switch is open, while the other operates to open and close a short circuit on said resistance to decrease the speed of the motor when said switch is closed.

In witness whereof, I have hereunto set my hand the 16th day of September, 1910.

ROBERT H. McLAIN.

Witnesses:
HELEN ORFORD,
THOMAS W. NOONAN.